United States Patent [19]
Martinsen

[11] 3,721,573

[45] March 20, 1973

[54] PEELING CITRUS FRUIT

[75] Inventor: Lyle J. Martinsen, Murray, Utah

[73] Assignee: Practical Innovations, Inc., Murray, Utah

[22] Filed: April 27, 1972

[21] Appl. No.: 248,359

Related U.S. Application Data

[62] Division of Ser. No. 9,804, Feb. 9, 1970, Pat. No. 3,674,503.

[52] U.S. Cl. ................... 99/233.12, 99/590, 30/2
[51] Int. Cl. ......................... A23l 1/00, A47j 17/04
[58] Field of Search ............... 146/3 B; 30/24, 123 C

[56] References Cited

UNITED STATES PATENTS

| | | |
|---|---|---|
| 2,522,054 | 9/1950 | Novak.................................146/3 B |
| 2,858,605 | 11/1958 | Engstrom...............................30/24 |

*Primary Examiner*—Willie G. Abercrombie
*Attorney*—Lynn G. Foster

[57] ABSTRACT

Peelers for cutting and peeling citrus fruit and the like and related methods. Each peeler is formed in one piece and has a holding flange adapted to be gripped between the fingers of the user, a cutting portion having a cutting edge, and a depth gauge flange which regulates the depth of the cut made by the cutting edge. The holding flange and the depth gauge flange are joined to one another by a weakened or structurally less resistant bend line so that in one position the two flanges are linearly continuous with the cutting edge being closely juxtaposed the opposed flanges whereby the user of the citrus fruit is not inadvertently cut, and in another position the two flanges are angular with respect to each other, the cutting edge being situated in an exposed cutting position. Each peeler may be conveniently releasably attached, as by bonding, to the citrus fruit so that the peeler and citrus fruit may be conveniently shipped, stored or carried by a person. The configuration of each peeler is adapted to match the exterior configuration of the fruit so as to be flush therewith when attached thereto.

14 Claims, 19 Drawing Figures

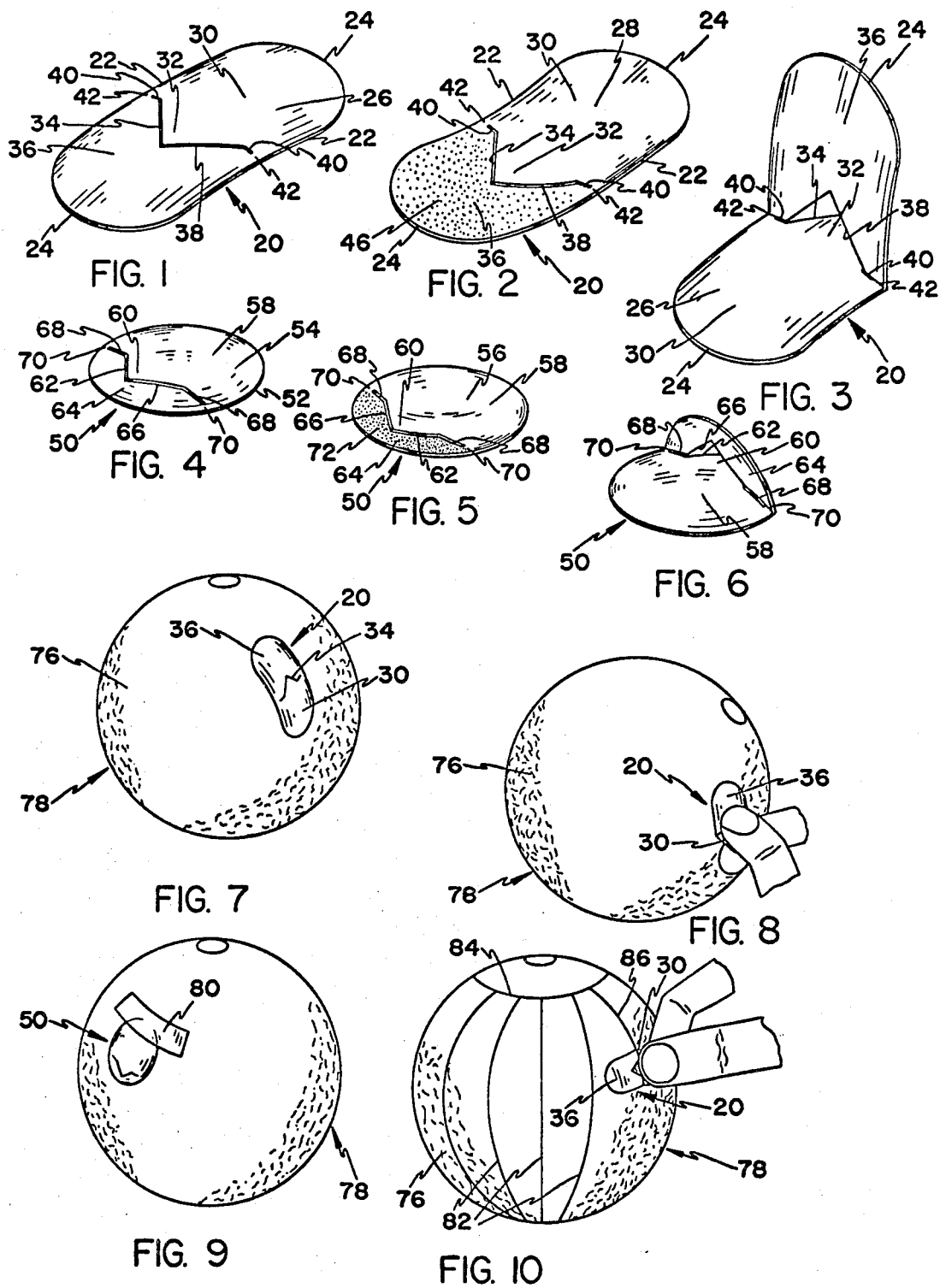

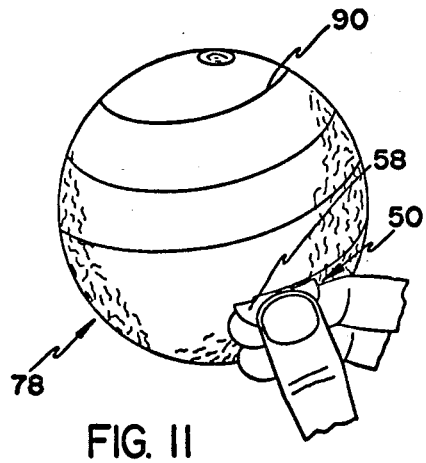
FIG. 11
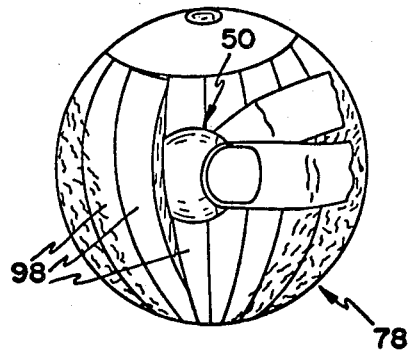
FIG. 13
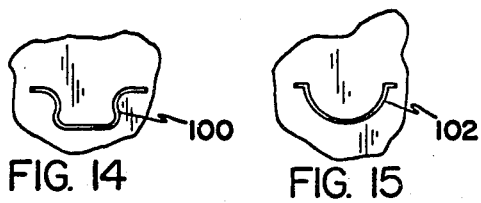
FIG. 14    FIG. 15
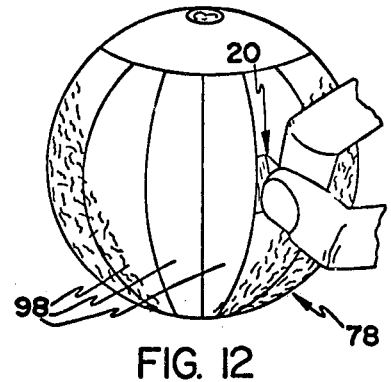
FIG. 12
FIG. 16    FIG. 17
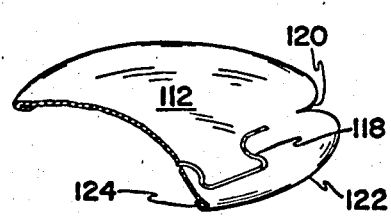
FIG. 18
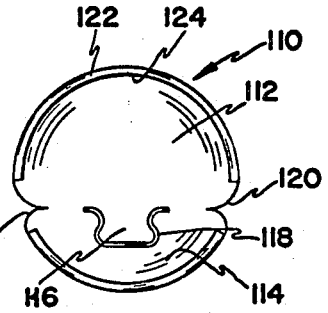
FIG. 19

PEELING CITRUS FRUIT

This application is a continuation and division of my copending U.S. Patent Application Ser. No. 9,804, filed Feb. 9, 1970, now U.S. Pat. No. 3,674,503.

BACKGROUND

1. Field of Invention

This invention relates in general to the peeling of citrus fruits, and in more particular to citrus peelers for cutting and peeling of citrus fruit and related methods.

2. Prior Art

Citrus fruit and various vegetables have an outer skin which protects the inner meat of the fruit from spoilage and damage. The outer skin of certain fruits and vegetables, such as the apple, are palatable and have a desirable taste and, therefore, such fruits are sometimes eaten with the skin intact. However, other fruits including citrus fruits, have a skin that for one reason or another, such as a bitter taste, is not desirable to eat. Fruits (and vegetables) in this latter group usually have the skin removed or at least cut so that the inner parts of the fruit may be eaten without having to bite into the skin.

Many fruits make tasty refreshers or snacks, and are often eaten by a person while away from normal eating facilities, e.g. at the office, when engaged in such activities as hiking, etc. Heretofore, a person so situated was required not only to bring the fruit or vegetable along with him, but also a suitable instrument such as a knife to cut and remove the skin of the fruit or the like. Without a cutting instrument, the person would usually bite into the skin in order to facilitate its removal, and thus received a bitter, or undesirable, taste from the skin.

Oftentimes, when engaged in sports or other activities, it is cumbersome to carry a cutting instrument. Further, the knife has a dangerous edge or point which must be kept sheathed, in order to prevent possible injury to the person carrying it. Also, many times such cutting instruments are highly unsanitary. These disadvantages of the cutting instrument of the prior art often resulted in the selection of some other refreshment or snack.

BRIEF SUMMARY AND OBJECTS OF THE PRESENT INVENTION

The disadvantages of prior art cutting instruments to remove peel from fruit and the like have been overcome or substantially alleviated by providing the novel peelers and related methods of the present invention. Each peeler is generally flat and has a holding flange which a person may grasp when using the peeler and a cutting edge for cutting the skin of the fruit into sections. The peeler may be relatively small, for example, about the size of a quarter of a dollar. A guide flange may be joined to the holding flange at a fold or bend line continuous with the cutting edge which, when folded into angular relation with the holding flange, acts as a guide and a depth gauge when the skin of the fruit is cut by the cutting edge. The peeler can be adhered to or otherwise suitably attached to the surface of the fruit in flush relation with the exterior of the fruit and thus can be conveniently transported prior to use. When the fruit is to be eaten, the peeler can be detached from the fruit and used to remove the skin of the fruit. When the peeler comprises a guide flange, the guide flange protects the adjacent cutting edge to avoid injury to the fruit or to the user. Thus, the present invention provides convenient, easily used cutting or peeling devices and methods whereby the skin of citrus fruit and the like is cut and/or peeled.

It is a primary object of the present invention to provide novel peelers for peeling citrus fruit and the like.

Another important object of the present invention is to provide a novel compact, and inexpensive cutting implement which is attached to fruit and the like for convenient joint transportation following which the implement can be detached from and used to cut the skin of the fruit.

It is a further significant object of this invention to provide a novel peeler having a cutting edge which is disposed in a safe position prior to use.

Another important object of the present invention is the provision of a unique method for using an instrument to cut and peel fruit.

Another paramount object is the provision of a novel method for packing a peeler with fruit and the like.

These and other objects and features of the present invention will become more fully apparent from the following description and appended claims taken in conjunction with the accompanying drawings.

BRIEF DESCRIPTION OF DRAWINGS

FIG. 1 is a perspective view of one side of one presently preferred peeler embodiment of this invention;

FIG. 2 is a perspective view of the other side of the embodiment of FIG. 1;

FIG. 3 is a perspective view similar to FIG. 1 but with the peeler in a bent or folded position;

FIG. 4 is a perspective view of one side of a second presently preferred peeler embodiment of the present invention;

FIG. 5 is a perspective view of the other side of the peeler of FIG. 4;

FIG. 6 is a perspective similar to FIG. 4 but with the peeler in a bent or folded position;

FIG. 7 is a perspective view of the peeler of FIG. 1 attached to an orange or other citrus fruit;

FIG. 8 is a perspective view similar to FIG. 7 with the peeler in the bent configuration being removed from a citrus fruit;

FIG. 9 is a perspective view of the peeler of FIG. 4 attached to a citrus fruit by a tape;

FIG. 10 is a perspective view of the peeler of FIG. 1 being used to cut the skin of a citrus fruit into sections;

FIG. 11 is a perspective view of the peeler of FIG. 4 being used to cut the skin of a citrus fruit;

FIG. 12 is a perspective view of the peeler of FIG. 1 in a bent position being used to separate the peel from the meat of the citrus fruit;

FIG. 13 is a perspective view of the peeler of FIG. 4, after having been restraightened, being used to separate the peel from the meat of the citrus fruit;

FIGS. 14–17 are fragmentary plan views of various cutting edges which may comprise the peelers of this invention;

FIG. 18 is a perspective view, with parts broken away for clarity of another peeler embodiment of the present invention; and FIG. 19 is a bottom plan view of the peeler of FIG. 18.

DETAILED DESCRIPTION OF THE ILLUSTRATED EMBODIMENT

FIGS. 1–3

A first presently preferred peeler according to the present invention is generally designated 20 and illustrated in FIGS. 1–3. The peeler 20 comprises an elongated flat plate having parallel side edges 22 joined one to another by opposed curved end edges 24. The entire thin peeler 20 is spherically curved, the imparting of a suitable curvature preferably being accomplished by conventional stamping techniques where metal ribbon stock or the like is used or by injection molding techniques where plastic material is used. Fiber or other suitable material impregnated with wax, resin or the like may also be used. The curvature of the peeler 20 has several advantages in that it imparts surprisingly high structural rigidity and strength and also facilitates attachment of the peeler to the citrus fruit in flush relation thereto. Thus, the peeler preferably has a curvature conforming to the spherical curvature of the exterior surface of citrus fruit having predetermined size. The peeler 20, therefore, is convexo, having an outer convex surface 26 (see FIG. 1) and an inner concave surface 28 (see FIG. 2).

One end of the peeler 20 comprises a holding flange, i.e. a handle which is grasped between the fingers by a person using the peeler. The holding flange 30 of the peeler 20 terminates at the distal end thereof in a cutting portion 32 which has a cutting edge 34. The cutting edge 34 is used to cut the skin or peel of the citrus fruit. The cutting edge 34 comprises part of a V-shaped slit 38, which may be formed during molding when plastic is used or by stamping when metal is used.

The peeler 20 also comprises a guide and depth gauge flange 36 which, as hereinafter more fully described, is used to regulate or gauge the depth to which the cutting portion of the peeler penetrates the skin of the citrus fruit.

Either or both flanges 30 and 36 provide convenient space to display advertising information, a trademark or the like.

Advantageously, the cutting edge 34 is initially situated in a protected position in close juxtaposition to the guide and depth gauge flange 36 so that injury to the user and the fruit is avoided.

The holding flange 30 is integrally joined to the flange 36 at junctures 42 which comprise a fold or bend line. The cross sectional area of the two junctures 42 is significantly less than a cross sectional area of either flange 30 or 36. Thus, the structural strength at 42 is relatively low so that one flange may be easily rotatably displaced about the fold line 42 in relation to the other flange to achieve an angular relation of the type illustrated in FIG. 3. If desired, the juncture or fold line at 42 may be indented or otherwise weakened to accommodate facile folding in the mentioned manner. The existence of terminal slits 40 at each end of the V-shaped slit 30 also facilitates easy bending.

The mentioned bending action not only exposes the cutting edge 34 for use in removing the skin from the citrus fruit but also orients the depth gauge flange 36 at a suitable angle to restrict the penetration of the point of the cutting edge 34 to a depth less than the distance to the meat of the citrus fruit.

With specific reference to FIG. 2, the concave surface of the flange 36 is illustrated as being coated with an agent 46 by which the peeler 20 is attached to the exterior surface of the citrus fruit. While the agent 46 may be an adhesive, it is presently preferred that a non-toxic, inert wax be used to securely adhere the peeler to the skin of the citrus fruit. The wax may be suitably applied by placing a liquid or semi-solid body of wax in the center of the concave area which it will ultimately cover. By gently pressing the surface upon which the pliable wax has been placed against the exterior surface of the fruit, the wax will spread or flatten to cover the entire desired area. Thus, only one flange 30 or 36 or both flanges may be so fixed to the fruit. Naturally, the wax should have a melting point greater than temperature encountered by the fruit both out of doors and indoors. Not only does the wax protect the fruit against injury but it is also water-resistant and complementary to the wax normally placed on the exterior of citrus fruits. Naturally, other techniques can be used to attach the peeler to the fruit.

FIGS. 4–6

Specific reference is now made to FIG. 4, which illustrates another presently preferred peeler embodiment according to the present invention, which is generally designated 50. The peeler 50 is circular in configuration, although generally flat and thin in its depth dimension. If desired, the peeler 50 may be of a small size, for example, about the size of a quarter of a dollar. The peeler 50 has a single continuous peripheral edge 52 which is rounded and of uniform radius. The peeler 52 is also convexo, having a convex surface 54 (FIG. 4) and a concave surface 56 (FIG. 5).

In a manner similar to previous described peeler 20, the peeler 50 comprises a holding flange 58 initially generally linearly continuous with a guide and depth guage flange 64.

The holding flange has a cutting portion 60 which terminates in a cutting edge 62, the cutting edge 62 forming part of the V-shaped slit 66. The V-shaped slit 66 terminates at each end in coaxial slits 68. Thus, the slits 68 and 66 may be regarded, in combination, as a circuitous perforation in the peeler 50.

The holding flange 58 and the guide and depth guage flange 64 are joined one to another at spaced junctures 70, which together comprise a bend or fold line. In a manner similar to that described in conjunction with peeler 20, the flange 64 may be rotated about the bend line 70 relative to the flange 58 to achieve a configuration of the type illustrated in FIG. 6. Thereafter, the peeler 50 may be used as described earlier in connection with peeler 20. Also, the fabrication of peeler 50 may be attended to in ways consistent with earlier statements made in this specification. Once the peeler 50 has been situated in the configuration of FIG. 6, both flanges 58 and 64 are and remain essentially rigid and highly resistent to any deformation when used for the purpose intended.

As shown in FIG. 5, a part (or all) of the concave surface of the peeler 50 may be coated with a suitable bonding agent 72, preferably wax as explained earlier in this specification.

FIGS. 7–12

While peelers according to the present invention can be distributed separate from the fruit with which they will ultimately be used, it is preferred that a peeler be secured or attached to each piece of fruit distributed to consumers. In this regard specific reference is made to FIG. 7 which illustrates the peeler 20 secured to the outer surface 76 of an orange 78 or the like by bonding agent (not shown). Apart from the separation caused by bonding agent, the inside concave surface of the peeler 20 fits contiguously against the spherical surface of the orange 78. The peeler 20 is, therefore, essentially flush with the orange 78. In this disposition, the cutting edge 34 is protected by the linearly-aligned depth guage flange 36. Thus, the initial cleanliness of the cutting edge 34 is protected by the linearly-aligned depth guage flange 36. Thus, the initial cleanliness of the cutting edge 34 is normally preserved. Proper adherence of the peeler 20 to the orange 78 prevents separation of the two during normal handling, shipping, and storage. Also, the space occupied by the peeler and orange in combination is, practically speaking, no greater than the space occupied by the orange alone. Thus, it is as convenient to transport and store the peeler in combination with the fruit as it is the fruit by itself.

A person may readily remove the peeler from the fruit by grasping one of the flanges, for example, flange 30, as illustrated in FIG. 8. The peeler 20 is also bent into the previously-mentioned configuration of FIG. 3, either during removal of the peeler from the fruit or afterward.

If desired, the peeler may be adhered to the surface of the fruit without interposing a bonding agent between the fruit and the peeler. For example, a tape 80 with adhesive on the underside (not shown) may be used, as illustrated in FIG. 9 in conjunction with the peeler 50.

Once the peeler has been lifted from the fruit and bent satisfactorily to expose the cutting edge, the peeler may be used to cut the skin or peel of the fruit. With reference to FIGS. 10 and 11, the user will ordinarily grasp the holding flange between his thumb and index finger and insert the protrusion of the cutting edge into the skin of the fruit until the depth gauge flange is contiguous with the external surface of the skin. The peeler is then moved relative to the fruit in the indicated disposition to make a network of cuts in the skin. Specifically, the skin is shown to have been cut at lines 82 into sections each of which merges with a top circular cut 84. The cutting edge of the peeler 20 in FIG. 10 is illustrated as being in the process of making a further cut 86.

With reference to FIG. 11, the skin of the orange 78 is shown as being cut at 90 in a helical configuration using the peeler 50. Naturally, the skin of the orange or other citrus fruit could be cut in various other ways.

As illustrated in FIG. 12, after the skin of the orange 78 has been cut into segments 98, the peeler, while still in the bent position of FIG. 3 may be used to assist in removing the skin from the meat of the fruit. This is achieved by inserting one of the flanges 30 or 36 between the skin and the meat of the fruit and using the peeler as a pry. Any peeler according to the present invention may be used in the bent position in the indicated manner or may be restraightened following cutting of the skin of the fruit and thereafter used as a pry. See FIG. 13.

FIGS. 14–17

While the V-shaped slits 38 and 42, and 66 and 68 are illustrated with respect to peelers 20 and 50, such a configuration is not critical to the present invention. Thus, various shapes of the slits can be used each defining a circuitous path. For example, the slits 100, 102, 104, and 106 of FIGS. 14–17 are suitable. Each presents a protrusion which can be used to penetrate the skin and some of which illustrate a generally linear central edge which would normally be displaced with the peeler so as to be closely spaced from the meat of the fruit. While not illustrated in FIGS. 14–17, each end of the slots 100, 102, 104, 106 would merge into a bend or fold line, which could comprise indented or weakened portions.

FIGS. 18 and 19

Specific reference is now made to FIGS. 18 and 19 which illustrate another presently preferred peeler, generally designated 110. The peeler 110 comprises a holding flange 112 and a depth guage flange 114, similar to the previously described peelers. The flanges 112 and 114 are joined one to another along a reduced cross sectional fold or bend line defined as an imaginery axis passing through both ends of the slit 118, which partially defines the cutting edge 116, and through the base of the two opposed notches 120. Thus, the depth guage flange 114 may be relatively rotated about the mentioned bend line with respect to the holding flange 112 to configurate the peeler 110 for use as a cutting instrument in the previously mentioned manner.

The peeler 110 has a rolled edge 122 which is formed in a conventional way, as for example, by using thin wall metal and rolling the metal upon itself along the edge. As illustrated in FIG. 19, the rolled edge 122 is interrupted adjacent the two notches 120 so that the rolled edge does not encumber the described bending action. If desired, a peeler according to the present invention may be conventionally stamped to produce a coin edge.

With some materials and under some circumstances, for the attachment medium (such as wax or adhesive) to function properly, it may be necessary to specially treat the surface of the peeler against which the attachment medium is to be placed. Conventional roughening, edging and like techniques can be utilized.

Each disclosed peeler is readily disposable and inexpensive and, therefore may be thrown away following use.

The invention may be embodied in other specific forms without departing from the spirit or other essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore to be embraced therein.

What is claimed and desired to be secured by United States Letters Patent is:

1. A peeler for peeling citrus fruit and the like comprising a one-piece initially generally flat implement which comprises guide means and holding means, one of said means having a cutting edge juxtaposed the other of said means, said guide means and said holding means being (a) connected one to another at a fold line means adjacent the cutting edge and (b) relatively foldable across the fold line means from the initial generally flat position to a second position wherein one of said means is angularly disposed with respect to the other of said means and the cutting edge is exposed for cutting the peeling of the citrus fruit in sections.

2. A peeler as defined in claim 1 wherein said cutting edge comprises the distal end portion of said holding means.

3. A peeler as defined in claim 1 wherein said cutting edge comprises at least part of the periphery of a slit formed in the peeler between the guide means and the holding means.

4. A peeler as defined in claim 3 wherein said slit is in the general configuration of a chevron.

5. A peeler as defined in claim 1 wherein said initially generally flat implement is slightly concave to fit contiguously against and be secured to the outer surface of the citrus fruit.

6. A peeler as defined in claim 5 further comprising attachment means adapted to secure the peeler to the outer surface of the citrus fruit.

7. A peeler as defined in claim 6 wherein the attachment means comprises a bonding agent.

8. A peeler for cutting the skin of citrus fruit and the like comprising a one-piece implement having a rigid depth gauge flange, a rigid holding flange having a cutting edge adjacent the depth gauge flange, said depth gauge flange and said holding flange being joined one to another at a bending line formed in said peeler between the flanges, the holding flange being relatively pivotable about the bending line with respect to the depth gauge flange from a position generally linear in relation to the depth gauge flange to a position angular in relation to the depth gauge flange.

9. A peeler as defined in claim 8 wherein the bending line has a cross-sectional area smaller than the cross-sectional area of either flange.

10. A peeler for cutting the skin of citrus fruit and the like comprising a plate having a holding flange and a cutting edge, the peeler being slightly concave to match the exterior surface of the citrus fruit.

11. In a method of peeling citrus fruit comprising: packaging a generally-flat peeler contiguously against and attached to the fruit, manually removing the flat peeler from the fruit, imparting a bend to the peeler to expose a cutting edge and provide a guide flange, inserting the cutting edge into the skin of the fruit, displacing the guide flange along the exterior surface of the fruit while maintaining the cutting edge in the skin to cut the skin into sections, and removing the skin sections from the fruit.

12. In a method as defined in claim 11 wherein the removing step comprises using the peeler as a pry to separate the skin sections from the fruit.

13. In a method of peeling citrus fruit comprising: packing a generally-flat peeler, having a cutting edge, contiguously against and attached to the fruit; manually removing the flat peeler from the fruit; inserting the cutting edge into the skin of the fruit, maintaining the cutting edge in the skin of the fruit while displacing the peeler along the exterior surface of the fruit to cut the skin into sections; and removing the sections from the fruit.

14. A thin-wall peeler for cutting the skin of citrus fruit and the like comprising a flange to be held manually between the fingers of the user and a cutting edge, the peeler further comprising attachment means securing the peeler to the outer surface of the fruit.

* * * * *